US010843653B2

(12) United States Patent
Ohno

(10) Patent No.: US 10,843,653 B2
(45) Date of Patent: Nov. 24, 2020

(54) VEHICLE SEAT AND VEHICLE

(71) Applicant: TOYOTA JIDOSHA KABUSHIKI KAISHA, Toyota (JP)

(72) Inventor: Mitsuyoshi Ohno, Miyoshi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 26 days.

(21) Appl. No.: 16/237,349

(22) Filed: Dec. 31, 2018

(65) Prior Publication Data

US 2019/0225184 A1 Jul. 25, 2019

(30) Foreign Application Priority Data

Jan. 23, 2018 (JP) ................................ 2018-008973

(51) Int. Cl.
| | |
|---|---|
| *B60R 21/231* | (2011.01) |
| *B60N 2/885* | (2018.01) |
| *B60N 2/00* | (2006.01) |
| *B60R 21/02* | (2006.01) |
| *B60N 2/22* | (2006.01) |

(Continued)

(52) U.S. Cl.
CPC .......... *B60R 21/23138* (2013.01); *B60N 2/00* (2013.01); *B60N 2/0252* (2013.01); *B60N 2/22* (2013.01); *B60N 2/34* (2013.01); *B60N 2/885* (2018.02); *B60R 21/01* (2013.01); *B60R 21/02* (2013.01); *B60R 2021/0006* (2013.01); *B60R 2021/0048* (2013.01);
(Continued)

(58) Field of Classification Search
CPC ... B60R 21/23138; B60R 21/02; B60R 21/01;
B60R 2021/022; B60R 2021/0293; B60R
2021/0048; B60R 2021/2074; B60R
2021/0006; B60N 2/885; B60N 2/00;
B60N 2/22; B60N 2/34; B60N 2/0252;
B60N 2/90
See application file for complete search history.

(56) References Cited

U.S. PATENT DOCUMENTS

| | | | | |
|---|---|---|---|---|
| 6,123,389 A | * | 9/2000 | O'Connor ............... | A47C 7/383 297/397 |
| 6,220,668 B1 | * | 4/2001 | Scheffzuck ............ | B60N 2/803 297/391 |

(Continued)

FOREIGN PATENT DOCUMENTS

| | | |
|---|---|---|
| JP | 2007-118775 A | 5/2007 |
| JP | 2008-074156 A | 4/2008 |

(Continued)

*Primary Examiner* — Darlene P Condra
(74) *Attorney, Agent, or Firm* — Oliff PLC

(57) ABSTRACT

A vehicle seat, which is provided in a vehicle equipped with a head portion protecting airbag that protects a head portion of a vehicle occupant at a time of a side collision, includes: a head portion restraining portion that is provided at an upper portion side of a seatback so as to be able to tilt rearward from an upright state, and that restrains a head portion of a vehicle occupant, wherein, when the seatback is tilted rearward beyond a predetermined angle with respect to a vertical direction, the head portion of the vehicle occupant can be protected due to at least a side portion that is at a vehicle transverse direction outer side of the head portion restraining portion covering a side of the head portion of the vehicle occupant.

20 Claims, 13 Drawing Sheets

(51) Int. Cl.
   *B60R 21/01*       (2006.01)
   *B60N 2/34*        (2006.01)
   *B60N 2/02*        (2006.01)
   *B60R 21/00*           (2006.01)
   *B60R 21/207*          (2006.01)
(52) U.S. Cl.
   CPC . *B60R 2021/022* (2013.01); *B60R 2021/0293* (2013.01); *B60R 2021/2074* (2013.01)

(56) References Cited

U.S. PATENT DOCUMENTS

| | | | | |
|---|---|---|---|---|
| 6,250,716 | B1* | 6/2001 | Clough | A47C 7/383 |
| | | | | 297/408 |
| 6,568,754 | B1* | 5/2003 | Norton | B60R 21/207 |
| | | | | 297/216.12 |
| 8,985,622 | B1* | 3/2015 | Cannon | B60R 21/231 |
| | | | | 280/730.2 |
| 2004/0075252 | A1* | 4/2004 | Pan | B60R 21/01542 |
| | | | | 280/730.1 |
| 2010/0264704 | A1* | 10/2010 | Yasuda | B60N 2/42781 |
| | | | | 297/216.12 |
| 2011/0254330 | A1* | 10/2011 | Lich | B60N 2/4279 |
| | | | | 297/216.1 |
| 2012/0086250 | A1* | 4/2012 | Stoessel | B60N 2/986 |
| | | | | 297/284.9 |
| 2015/0145309 | A1* | 5/2015 | Takahashi | B60N 2/838 |
| | | | | 297/404 |
| 2015/0353050 | A1* | 12/2015 | Han | B60N 2/42 |
| | | | | 297/217.2 |
| 2016/0082915 | A1* | 3/2016 | Madaras | B60R 21/207 |
| | | | | 297/216.2 |
| 2016/0159251 | A1 | 6/2016 | Ebina et al. | |
| 2017/0136842 | A1* | 5/2017 | Anderson | B60G 17/0195 |
| 2017/0217335 | A1 | 8/2017 | Tominaga et al. | |
| 2017/0259704 | A1* | 9/2017 | Madaras | B60R 21/04 |
| 2017/0291516 | A1* | 10/2017 | Tat | B60N 2/885 |
| 2018/0126933 | A1* | 5/2018 | Kawase | B60R 16/04 |
| 2018/0126944 | A1* | 5/2018 | Choi | B60R 21/215 |
| 2019/0176739 | A1* | 6/2019 | Song | B60R 21/23138 |

FOREIGN PATENT DOCUMENTS

| | | |
|---|---|---|
| JP | 2009-292418 A | 12/2009 |
| JP | 2010-125942 A | 6/2010 |
| JP | 2010-137666 A | 6/2010 |
| JP | 2012-224307 A | 11/2012 |
| JP | 2016-168972 A | 9/2016 |
| JP | 2017-132383 A | 8/2017 |
| JP | 2017-136898 A | 8/2017 |
| JP | 2017-170942 A | 9/2017 |
| WO | 2015/011866 A1 | 1/2015 |

\* cited by examiner

FIG.4

|  | SEATBACK ANGLE(α) | |
| --- | --- | --- |
|  | USUAL (LESS THAN OR EQUAL TO 45°) | COMFORTABLE (GREATER THAN 45°) |
| MANUAL DRIVING MODE | D1 | D1 |
| AUTOMATIC DRIVING MODE | D1 | D2 |

D1: SIDE PORTION AT USUAL POSITION
D2: SIDE PORTION AT PROJECTED POSITION

FIG.9

| | SEATBACK ANGLE(α) AT DRIVER'S SEAT SIDE | | SEATBACK ANGLE(α) AT FRONT PASSENGER'S SEAT SIDE | |
|---|---|---|---|---|
| | USUAL (LESS THAN OR EQUAL TO 45°) | COMFORTABLE (GREATER THAN 45°) | USUAL (LESS THAN OR EQUAL TO 45°) | COMFORTABLE (GREATER THAN 45°) |
| MANUAL DRIVING MODE | D1 | D1 | D1 | D2 |
| AUTOMATIC DRIVING MODE | D1 | D2 | D1 | D2 |

D1: SIDE PORTION AT USUAL POSITION
D2: SIDE PORTION AT PROJECTED POSITION

VEHICLE SEAT AND VEHICLE

CROSS-REFERENCE TO RELATED APPLICATION

This application is based upon and claims the benefit of priority of the prior Japanese Patent Application No. 2018-008973, filed on Jan. 23, 2018, the entire contents of which are incorporated herein by reference.

FIELD

The embodiments discussed herein are related to a vehicle seat and a vehicle.

BACKGROUND

Patent Document 1 (International Publication No. 2015/011866) discloses a drive assisting device for a vehicle and a drive assisting method for a vehicle that control a reclining angle adjusting portion such that the reclining angle in an automatic driving mode is greater than the reclining angle in a manual driving mode.

Patent Document 2 (Japanese Patent Application Laid-Open (JP-A) No. 2017-132383) discloses a vehicle seat device that is used in a vehicle that can switch between a manual driving state and an automatic driving state, in which, by calculating the attitude of a relaxed position (e.g., a comfortable attitude) in accordance with the physique of the driver, an optimal relaxed position is realized without the driver adjusting the amount of movement of the seat. Further, Patent Document 3 (JP-A No. 2017-136898) discloses a vehicle seat controlling device that is used in a vehicle that can switch between a manual driving state and an automatic driving state, and in which, when transitioning from the manual driving state to the automatic driving state, the seatback tilted rearward and the seat cushion is tilted. Further, Patent Document 4 (JP-A No. 2017-170942) discloses a vehicle seat that permits the relative displacement amount of the respective portions of a seat in an automatic driving state to be in a wider range than when in a manual driving state. Moreover, Patent Document 5 ((JP-A) No. 2016-168972) discloses a driving position controlling device in which, when switching from manual driving to automatic driving, a seat is moved to a second position which is a more relaxed attitude than a first position that is suited to driving during manual driving. Still further, Patent Document 6 (JP-A No. 2010-125942) and Patent Document 7 (JP-A No. 2010-137666) disclose vehicle occupant head portion restraining devices for a side collision that protect the head portion of a vehicle occupant by a headrest at the time of a side collision.

In the structure of Patent Document 1 (International Publication No. 2015/011866), when, in the automatic driving mode, the seatback is set in a comfortable attitude (e.g., a relaxed attitude) in which the seatback is tilted rearward greatly, there is the possibility that the head portion of the vehicle occupant will come out of the head portion protection area of a curtain airbag. Therefore, it is thought that, at the time of a side collision while in the comfortable attitude, the head portion of the vehicle occupant will not be able to be sufficiently restrained by the curtain airbag, and there is room for improvement.

SUMMARY

In view of the above-described circumstances, an object of the present disclosure is to provide a vehicle seat and a vehicle that can protect the head portion of a vehicle occupant at the time of a side collision.

A vehicle seat relating to a first aspect is a vehicle seat that is provided in a vehicle equipped with a head portion protecting airbag that protects a head portion of a vehicle occupant at a time of a side collision, the vehicle seat including: a head portion restraining portion that is provided at an upper portion side of a seatback so as to be able to tilt rearward from an upright state, and that restrains a head portion of a vehicle occupant, wherein, when the seatback is tilted rearward beyond a predetermined angle with respect to a vertical direction, the head portion of the vehicle occupant can be protected due to at least a side portion that is at a vehicle transverse direction outer side of the head portion restraining portion covering a side of the head portion of the vehicle occupant.

In accordance with the vehicle seat relating to the first aspect, the head portion restraining portion that restrains the head portion of a vehicle occupant is provided at the upper portion side of the seatback that is provided so as to be able to tilt rearward (i.e., so as to be able to recline) from an upright state. When the seatback is tilted rearward beyond a predetermined angle with respect to the vertical direction, at least the side portion that is at the vehicle transverse direction outer side of the head portion restraining portion covers the side of the head portion of the vehicle occupant. Due thereto, in the case of a comfortable attitude in which the seatback is tilted rearward greatly, the head portion of the vehicle occupant can be protected from a side collision by at least the side portion that is at the vehicle transverse direction outer side of the head portion restraining portion.

In a vehicle seat relating to a second aspect, in the vehicle seat of the first aspect, the side portion that is at the vehicle transverse direction outer side of the head portion restraining portion incorporates a hard pad therein, and, when the seatback is tilted rearward, at least the side portion that is at the vehicle transverse direction outer side of the head portion restraining portion projects out toward a seat front side.

In accordance with the vehicle seat relating to the second aspect, the side portion that is at the vehicle transverse direction outer side of the head portion restraining portion incorporates a hard pad therein. When the seatback is tilted rearward, at least the side portion that is at the vehicle transverse direction outer side of the head portion restraining portion projects out toward the seat front side. Due thereto, when the seatback is tilted rearward, the side of the head portion of the vehicle occupant is covered by the side portion that is at the vehicle transverse direction outer side of the head portion restraining portion and that incorporates the hard pad therein. Thus, the head portion of the vehicle occupant can be protected effectively from a side collision.

In a vehicle seat relating to a third aspect, in the vehicle seat of the first aspect, the vehicle can switch between an automatic driving mode and a manual driving mode, and, when the seatback is tilted rearward in the automatic driving mode, a side portion of the head portion restraining portion projects out toward a seat front side.

In accordance with the vehicle seat relating to the third aspect, in the automatic driving mode, in the case of a comfortable attitude in which the seatback is greatly tilted rearward, the side portion of the head portion restraining portion projects out toward the seat front side, and, due thereto, the side of the head portion of the vehicle occupant is covered by the side portion of the head portion restraining portion. Therefore, the head portion of the vehicle occupant can be protected effectively from a side collision. Further, in the automatic driving mode, the side visual fields of the vehicle occupant are not as important as in the manual driving mode, and therefore, it is difficult for the projected out side portion of the head portion restraining portion to obstruct the side visual field of the vehicle occupant.

In a vehicle seat relating to a fourth aspect, in the vehicle seat of the third aspect, when the seatback is tilted rearward in the manual driving mode, the side portion of the head portion restraining portion does not project-out toward the seat front side.

In accordance with the vehicle seat relating to the fourth aspect, when the seatback is tilted rearward in the manual driving mode, the side portion of the head portion restraining portion is not projected out toward the seat front side. Therefore, the side portion of the head portion restraining portion is not a hindrance to driving.

In a vehicle seat relating to a fifth aspect, in the vehicle seat of the third aspect, when the seatback is tilted rearward in the manual driving mode, at a driver's seat, the side portion of the head portion restraining portion is not projected out toward the seat front side, and, at a front passenger's seat, the side portion of the head portion restraining portion is projected out toward the seat front side.

In accordance with the vehicle seat relating to the fifth aspect, when the seatback is tilted rearward in the manual driving mode, at the driver's seat, the side portion of the head portion restraining portion is not projected out toward the seat front side, and therefore, the side portion of the head portion restraining portion is not a hindrance to driving. Further, when the seatback is tilted rearward in the manual driving mode, at the front passenger's seat, the side portion of the head portion restraining portion is projected out toward the seat front side, and therefore, the head portion of the vehicle occupant seated in the front passenger's seat can be protected effectively from a side collision. Further, due to the vehicle occupant P, who is seated in the front passenger's seat and who is not involved in the driving, tilting the seatback rearward, the vehicle occupant can assume a relaxed position.

In a vehicle seat relating to a sixth aspect, in the vehicle seat of the first aspect, an amount of projection, toward a seat front side, of the side portion that is at the vehicle transverse direction outer side of the head portion restraining portion is greater than an amount of projection, toward the seat front side, of a side portion that is at a vehicle transverse direction inner side of the head portion restraining portion.

In accordance with the vehicle seat relating to the sixth aspect, the amount of projection, toward the seat front side, of the side portion that is at the vehicle transverse direction outer side of the head portion restraining portion is made to be greater than the amount of projection, toward the seat front side, of the side portion that is at the vehicle transverse direction inner side of the head portion restraining portion. Due thereto, the head portion of the vehicle occupant can be effectively protected from a side collision.

In a vehicle seat relating to a seventh aspect, in the vehicle seat of the first aspect, the head portion restraining portion is a headrest that is provided as a body separate from the seatback.

In accordance with the vehicle seat relating to the seventh aspect, the head portion restraining portion is a headrest that is provided as a body separate from the seatback. Therefore, when the seatback is tilted rearward, the side portion of the headrest can be moved by a simple structure.

A vehicle relating to an eight aspect has: the vehicle seat of the first aspect; and a head portion protecting airbag that is provided at a reverse surface side of a vehicle transverse direction outer side end portion of a roof head lining, and that, at a time of a side collision, inflates and expands toward a vehicle vertical direction lower side and protects a head portion of a vehicle occupant.

In accordance with the vehicle relating to the eighth aspect, when the seatback of the vehicle seat is tilted rearward beyond a predetermined angle with respect to the vertical direction, at least the side portion that is at the vehicle transverse direction outer side of the head portion restraining portion covers the side of the head portion of the vehicle occupant. Therefore, at the time of a side collision, the head portion of the vehicle occupant can be protected.

In a vehicle relating to a ninth aspect, in the vehicle of the eighth aspect, the vehicle can switch between an automatic driving mode and a manual driving mode.

In accordance with the vehicle relating to the ninth aspect, the vehicle can be switched between an automatic driving mode and a manual driving mode. Due thereto, operation of at least the side portion that is at the vehicle transverse direction outer side of the head portion restraining portion can be changed in the automatic driving mode and the manual driving mode.

In accordance with the vehicle seat and the vehicle of the present disclosure, the head portion of a vehicle occupant can be protected at the time of a side collision.

BRIEF DESCRIPTION OF DRAWINGS

FIG. 4 is a chart that compares the positions of side portions of the headrest with respect to the seatback angle, in a manual driving mode and an automatic driving mode, at the vehicle seat relating to the first embodiment.

FIG. 9 is a chart that compares the positions of side portions of the headrest with respect to the seatback angle of a driver's seat and a front passenger's seat, in a manual driving mode and an automatic driving mode in the vehicle seat relating to the third embodiment.

DESCRIPTION OF EMBODIMENTS

Embodiments of the present disclosure are described in detail on the basis of the drawings. Note that arrow FR that is shown appropriately in these drawings indicates the vehicle front side, arrow UP indicates the vehicle upper side, and arrow OUT indicates a vehicle transverse direction outer side (i.e., the right side RH). Further, in the embodiments of the present disclosure, the seat front side, the seat transverse direction and the seat upper side substantially coincide with the vehicle front side, the vehicle transverse direction and the vehicle upper side, and therefore, are uniformly called the vehicle front side, the vehicle transverse direction and the vehicle upper side.

First Embodiment

A vehicle seat relating to a first embodiment is described with reference to FIG. 1 through FIG. 6. Further, the respective drawings are schematic, and illustration of portions having little relation to the present disclosure is omitted.

<Structure of Vehicle Seat>

Figure 1:
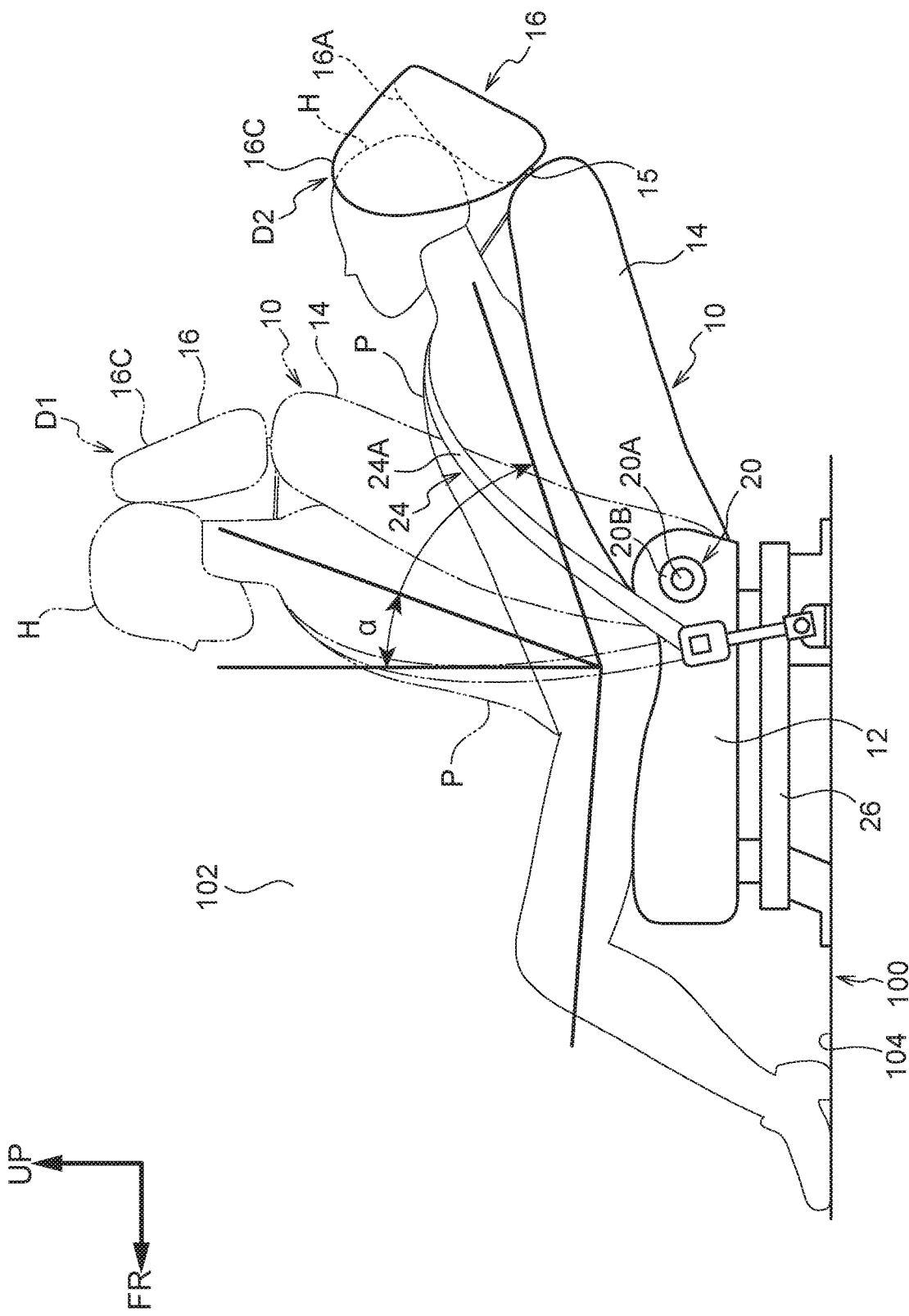
FIG. 1 is side view showing a vehicle seat relating to a first embodiment.

As shown in FIG. 1, a vehicle seat (hereinafter simply called "seat") 10 relating to the first embodiment has a seat cushion 12 on which a vehicle occupant P sits, and a seatback 14 that supports the back portion of the vehicle occupant P at the rear end portion of the seat cushion 12. A headrest 16, which serves as a head portion restraining portion that restrains the head portion of the vehicle occupant, is mounted to the upper end portion of the seatback 14. The headrest 16 is provided at the upper portion side of the seatback 14 as a body that is separate from the seatback 14. In the first embodiment, the headrest 16 is mounted to the seatback 14 via headrest stays 15 that can move in the axial direction with respect to the seatback 14. The seat 10 is, for example, a driver's seat that is provided at the driver's seat side that is at the vehicle front right side within a vehicle cabin 102 of a vehicle 100. Note that he vehicle occupant P who is seated in the seat 10 is illustrated as a dummy.

The seat 10 has a reclining function that tilts the seatback 14 rearward (i.e., tilts the seatback 14 toward the vehicle rear side) from an upright state. More concretely, the seat 10 has a seatback angle changing portion (i.e., a reclining mechanism) 20 that changes angle α of the seatback 14 with respect to the vertical direction. The seatback angle changing portion 20 has, as an example, a rotating shaft (e.g., a reclining rod) 20A that is connected to a rod (not illustrated) disposed in the vehicle transverse direction at the lower end portion of the seatback 14, a guide portion 20B that supports the rotating shaft 20A rotatably, and a driving portion (not illustrated) that rotates the rotating shaft 20A. The guide portion 20B is provided at a side portion of the seat cushion 12. The driving portion that rotates the rotating shaft 20A is structured by a motor or the like for example.

The seat 10 has a seatback angle detecting portion 22 (see FIG. 3) that detects the angle α of the seatback 14 with respect to the vertical direction. Although not illustrated, the seatback angle detecting portion 22 is provided at a position, which faces the rotating shaft 20A, at the guide portion 20B for example.

Note that a seatbelt device 24, which has a shoulder belt 24A that restrains the vehicle occupant P, is provided at the seat 10. Further, the seat cushion 12 is provided so as to be slidable in the vehicle longitudinal direction along rails 26 that are fixed to a floor portion 104 of the vehicle 100.

Figure 2:
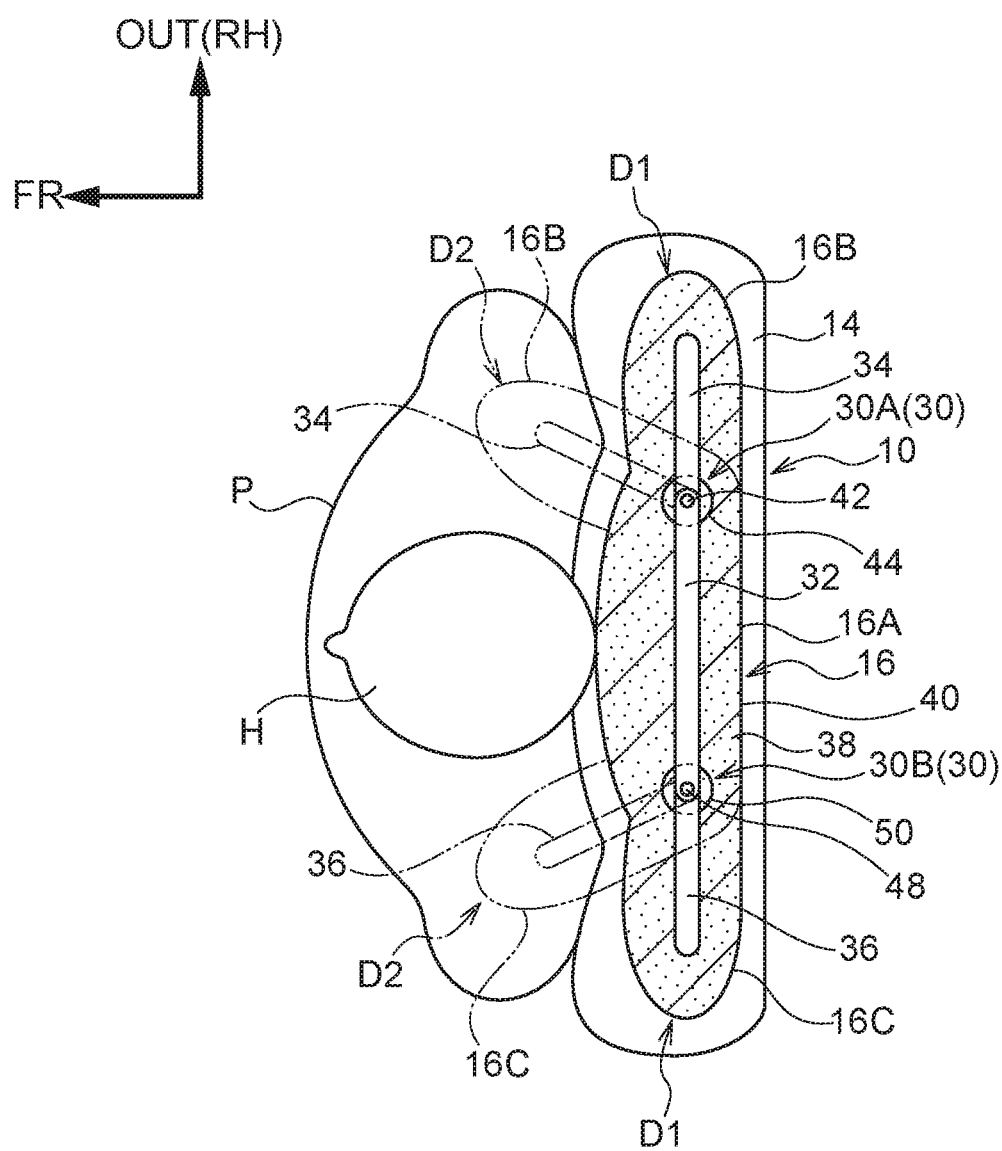
FIG. 2 is a plan sectional view along the vehicle transverse direction, showing a headrest that is used in the vehicle seat relating to the first embodiment.

As shown in FIG. 2, the headrest 16 is disposed at the upper side of the seatback 14 along the vehicle transverse direction, and is a laterally-long shape in which the vehicle transverse direction length thereof is long as compared with the vehicle longitudinal direction length thereof. The headrest 16 has, at the vehicle transverse direction (i.e., the seat transverse direction) intermediate portion, a main body portion 16A that faces a head portion (an example of a head portion of a vehicle occupant) H of the vehicle occupant P who is seated in the seat 10, and has side portions 16B, 16C that are disposed at the vehicle transverse direction both sides of the main body portion 16A. As seen in a vehicle rear view (i.e., from the vehicle rear side), the side portion 16B is disposed at the vehicle transverse direction right side (the vehicle transverse direction outer side in the first embodiment), and the side portion 16C is disposed at the vehicle transverse direction left side (the vehicle transverse direction inner side in the first embodiment).

The seat 10 has a side portion moving device 30 that causes the side portions 16B, 16C to project-out toward the vehicle front side (i.e., the seat front side) with respect to the main body portion 16A of the headrest 16. The side portion moving device 30 has a first moving portion 30A that moves the side portion 16B, and a second moving portion 30B that moves the side portion 16C. At the seat 10, for example, in the upright state in which the seatback 14 is not tilted rearward (i.e., is not reclined), the side portions 16B, 16C are disposed at usual positions D1 that are on an extended line of the length direction of the main body portion 16A. Under a predetermined condition that is described hereinafter, the first moving portion 30A moves the side portion 16B from the usual position D1 to a projected position D2 of projecting-out toward the vehicle front side. Further, under a predetermined condition that is described hereinafter, the second moving portion 30B moves the side portion 16C from the usual position D1 to the projected position D2 of projecting-out toward the vehicle front side.

A frame 32 that is disposed along the vehicle transverse direction is provided at the interior of the main body portion 16A. A frame 34 that is disposed along the vehicle transverse direction is provided at the interior of the side portion 16B, and a frame 36 that is provided along the vehicle transverse direction is provided at the interior of the side portion 16C. Further, a pad 38 is provided at the interior of the headrest 16 so as to surround the periphery of the frames 32, 34, 36. A skin 40 is provided at the surface of the pad 38. The pad 38 is formed, for example, of a foamed resin such as urethane foam or the like.

The first moving portion 30A has a rotating shaft 42 that is inserted-through the portion where the vehicle transverse direction outer side end portion of the frame 32 and the vehicle transverse direction inner side end portion of the frame 34 that is within the side portion 16B overlap one another. The rotating shaft 42 is disposed along substantially the vehicle vertical direction of the headrest 16. The rotating shaft 42 is joined (i.e., fixed) to the frame 34 and rotates integrally with the frame 34. The rotating shaft 42 is not joined to the frame 32, and the rotating shaft 42 can rotate with respect to the frame 32. Moreover, the first moving portion 30A has a driving portion 44 that is connected to an axial direction end portion of the rotating shaft 42. The driving portion 44 is, for example, a motor that rotates the rotating shaft 42.

At the first moving portion 30A, due to the driving portion 44 rotating the rotating shaft 42 in the forward direction (i.e., counterclockwise in FIG. 2), the side portion 16B that has the frame 34 is moved from the usual position D1 to the projected position D2 of projecting-out toward the vehicle front side. Further, at the first moving portion 30A, due to the driving portion 44 rotating the rotating shaft 42 in the opposite direction (e.g., clockwise in FIG. 2), the side portion 16B is returned to the usual position D1. In the state in which the side portion 16B has moved to the projected position D2, the side of the head portion H of the vehicle occupant P is covered by the side portion 16B, and, due thereto, the head portion H of the vehicle occupant P is protected at the time of a side collision.

Similarly, as shown in FIG. 2, the second moving portion 30B has a rotating shaft 48 that is inserted-through the portion where the vehicle transverse direction inner side end portion of the frame 32 and the vehicle transverse direction outer side end portion of the frame 36 that is within the side portion 16C overlap one another. The rotating shaft 48 is disposed along substantially the vehicle vertical direction of the headrest 16. The rotating shaft 48 is joined (i.e., fixed) to the frame 36 and rotates integrally with the frame 36. The rotating shaft 48 is not joined to the frame 32, and the rotating shaft 48 can rotate with respect to the frame 32. Moreover, the second moving portion 30B has a driving portion 50 that is connected to an axial direction end portion of the rotating shaft 48. The driving portion 50 is, for example, a motor that rotates the rotating shaft 48.

At the second moving portion 30B, due to the driving portion 50 rotating the rotating shaft 48 in the forward direction (i.e., clockwise in FIG. 2), the side portion 16C that has the frame 36 is rotated from the usual position D1 to the projected position D2 of projecting-out toward the vehicle front side. Further, at the second moving portion 30B, due to the driving portion 50 rotating the rotating shaft 48 in the opposite direction (e.g., counterclockwise in FIG. 2), the side portion 16C is returned to the usual position D1. In the state in which the side portion 16C has moved to the projected position D2, the side of the head portion H of the vehicle occupant P is covered by the side portion 16C, and, due thereto, the head portion H of the vehicle occupant P is protected at the time of a side collision.

<Structure of Seat Controlling Device>

Figure 3:
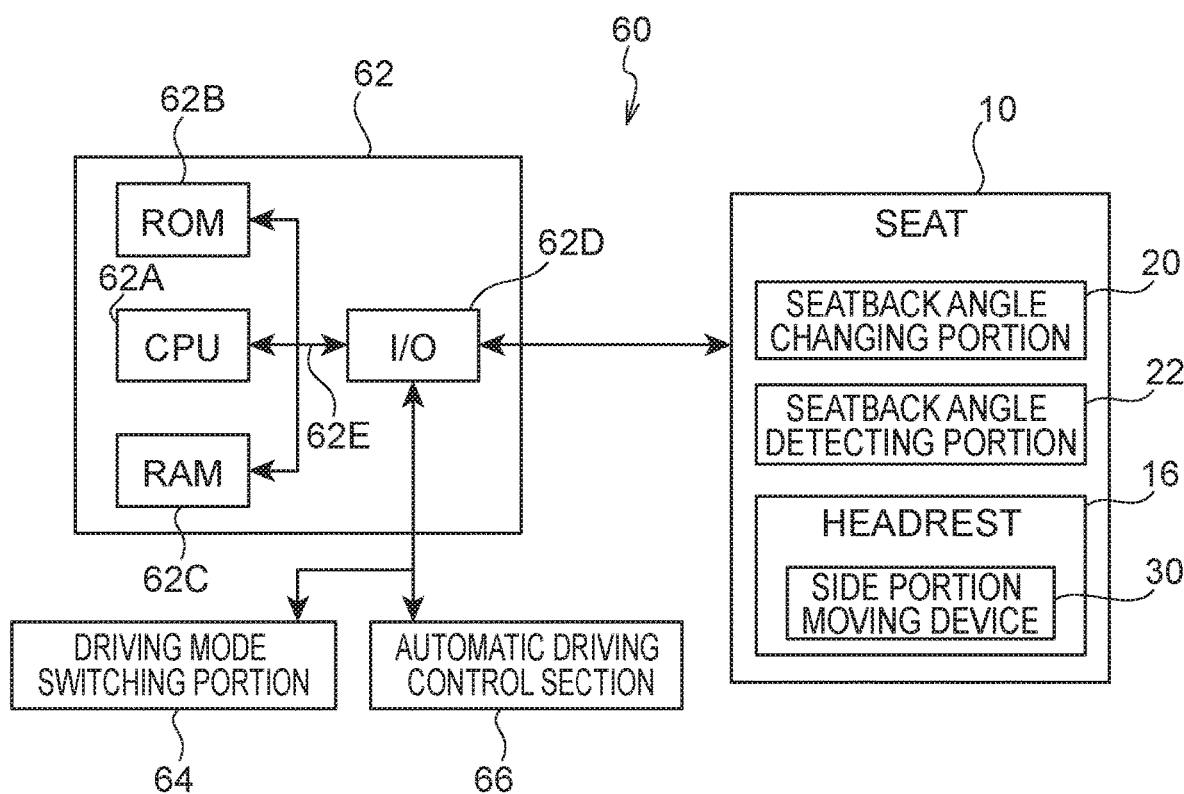
FIG. 3 is a block drawing showing the structure of a controlling device of the vehicle seat relating to the first embodiment.

FIG. 3 is a block drawing showing the structure of a seat controlling device 60 that controls the position of the seat 10. Although not illustrated, the seat controlling device 60 is provided, for example, at the interior of an instrument panel 106 (see FIG. 6) that is disposed at the vehicle longitudinal direction front side of the interior of the vehicle cabin 102 of the vehicle 100. As shown in FIG. 3, the seat controlling device 60 has the seat 10 and a control section 62 that controls the position of the seat 10.

The control section 62 is structured by a computer in which a CPU (Central Processing Unit) 62A, a ROM (Read Only Memory) 62B, a RAM (Random Access Memory) 62C and an I/O (i.e., an input/output interface) 62D are connected by a bus 62E.

A program for controlling the positions of the seatback 14 and the headrest 16 of the seat 10 is stored in the ROM 62B. Control of the positions of the seatback 14 and the headrest 16 is carried out due to the program that is stored in the ROM 62B being expanded in the RAM 62C and executed by the CPU 62A.

The seat 10 that is the object of control is connected to the I/O 62D. A driving mode switching portion 64 and an automatic driving control section 66 are connected to the I/O 62D.

The seat 10 has the seatback angle changing portion 20, and operation of the seatback angle changing portion 20 is controlled by the control section 62. More concretely, the rotating shaft 20A (see FIG. 1) is rotated due to a driving portion (not illustrated) of the seatback angle changing portion 20 being operated by the control section 62. Due thereto, the seatback 14 is tilted rearward (i.e., is tilted toward the vehicle rear side), or the seatback 14 is returned to the upright state.

The seat 10 has the seatback angle detecting portion 22. The angle $\alpha$ (see FIG. 1) of the seatback 14 with respect to the vertical direction is detected by the seatback angle detecting portion 22. The angle $\alpha$ of the seatback 14 that is detected by the seatback angle detecting portion 22 is inputted to the control section 62.

The seat 10 has the side portion moving device 30 of the headrest 16, and operation of the side portion moving device 30 is controlled by the control section 62. More concretely, the driving portions 44, 50 (see FIG. 2) of the side portion moving device 30 are operated by the control section 62. Due thereto, the side portions 16B, 16C of the headrest 16 are moved to the projected positions D2 of being projected-out toward the vehicle front side, or the side portions 16B, 16C are returned to the usual positions D1 (see FIG. 2). The control section 62 controls the operation of the side portion moving device 30 on the basis of the angle $\alpha$ of the seatback 14 that is detected by the seatback angle detecting portion 22.

The driving mode switching portion 64 can switch the driving mode of the vehicle to either of a manual driving mode (in the first embodiment, a usual driving mode) and an automatic driving mode. The vehicle occupant P can switch to the automatic driving mode or the manual driving mode by selecting the automatic driving mode or the manual driving mode by the driving mode switching portion 64. The driving mode switching portion 64 is provided, for example, at the instrument panel 106 (see FIG. 6) that is disposed within the vehicle chamber 102 of the vehicle 100. In a case in which the vehicle occupant P selects the automatic driving mode, traveling of the vehicle 100 is controlled by the automatic driving control section 66.

The control section 62 changes the control of the operations of the side portion moving device 30 as follows, at the time when the manual driving mode is selected and at the time when the automatic driving mode is selected.

<Control of Seat Controlling Device>

The relationship between the angle $\alpha$ of the seatback 14 with respect to the vertical direction, and the positions of the side portions 16B, 16C of the headrest 16, in the manual driving mode and the automatic driving mode is shown in FIG. 4. As shown in FIG. 4, in the manual driving mode, the side portions 16B, 16C of the headrest 16 are disposed at the usual position D1 (see FIG. 2) regardless of the angle $\alpha$ of the seatback 14 with respect to the vertical direction.

Further, in the automatic driving mode, the angle $\alpha$ of the seatback 14 with respect to the vertical direction being less than or equal to a predetermined angle (e.g., 45°) is a usual state. In the usual state, the side portions 16B, 16C of the headrest 16 are disposed at the usual positions D1. Further, in the automatic driving mode, the angle $\alpha$ of the seatback 14 with respect to the vertical direction being greater than the predetermined angle (e.g., 45°) is a comfortable state. In the comfortable state, the side portions 16B, 16C of the headrest 16 are disposed at the projected positions D2 (see FIG. 2).

Figure 6:
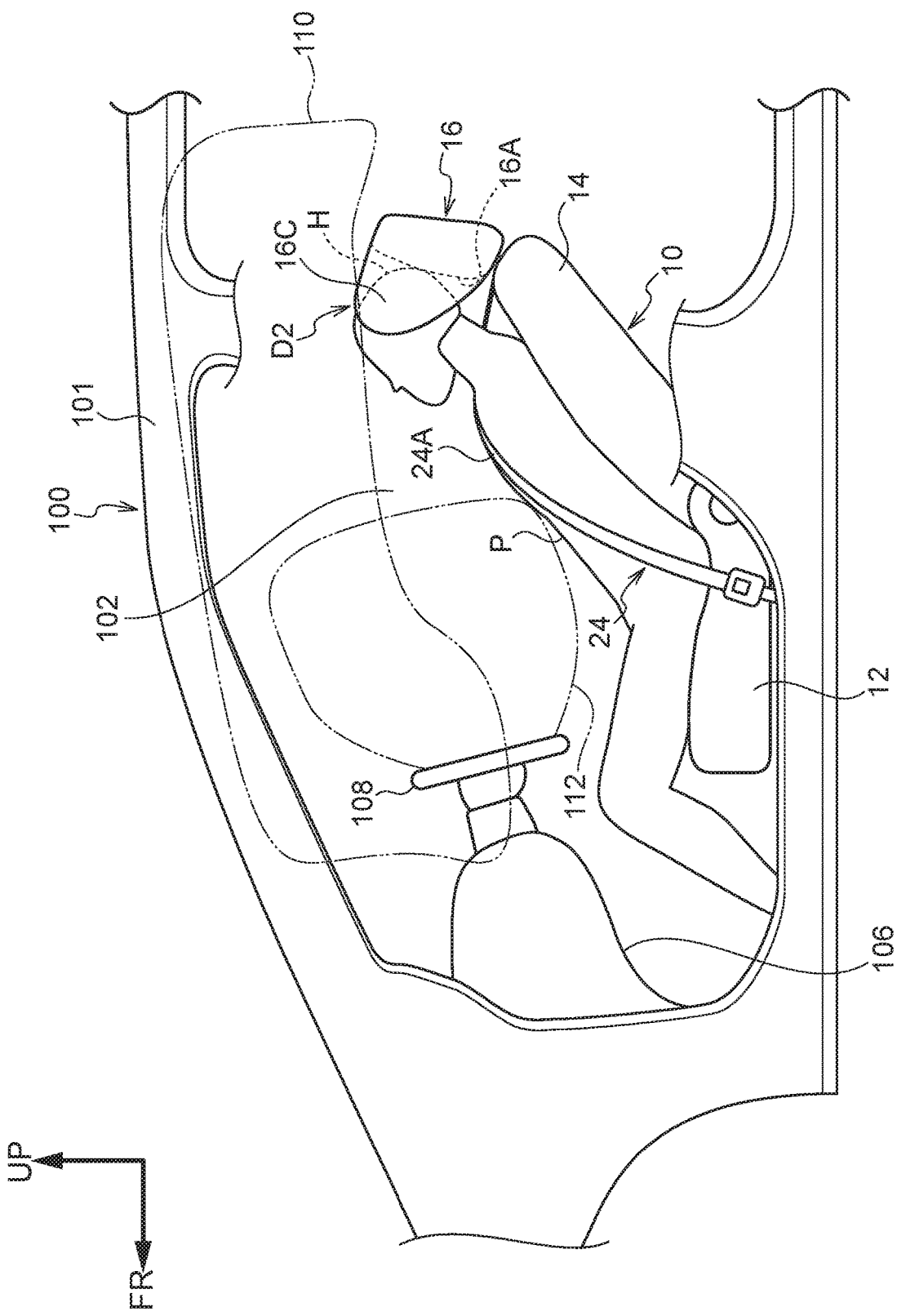
FIG. 6 is a schematic side view showing a state in which a seatback has been tilted rearward beyond a predetermined angle with respect to the vertical direction, in a vehicle that is equipped with the vehicle seat relating to the first embodiment.

As shown in FIG. 6, roof side rails 101 are provided substantially along the vehicle longitudinal direction at the vehicle upper portion of the vehicle 100. A curtain airbag 110 that protects the head portion H of the vehicle occupant P at the time of a side collision is provided at the vehicle transverse direction inner side of the roof side rail 101, at the reverse surface side of the vehicle transverse direction outer side end portion of a roof head lining (not illustrated). Further, a front airbag 112 that protects the vehicle occupant P at the time of a front collision is provided at the vehicle 100 at a steering wheel 108 that is at the front side in the vehicle longitudinal direction. In FIG. 6, the curtain airbag 110 and the front airbag 112 are shown in their deployed states, for easy understanding of the structures. At the time of a side collision, the curtain airbag 110 inflates and expands in the form of a curtain toward the vehicle vertical direction lower side, and protects the head portion H of the vehicle occupant P at the area where the head portion H overlaps the curtain airbag 110 (i.e., a protection area).

At the seat 10, when the seatback 14 is reclined rearward greatly, there is the possibility that the head portion H of the vehicle occupant P who is seated in the seat 10 will come out of the protection area of the curtain airbag 110. In the first embodiment, when the angle α (see FIG. 1) of the seatback 14 with respect to the vertical direction is greater than the predetermined angle (e.g., 45°), the side portions 16B, 16C of the headrest 16 are moved to the projected positions D2. Due thereto, the sides of the head portion H of the vehicle occupant P are covered by the side portions 16B, 16C (in the first embodiment, in particular, the side portion 16B that is at the vehicle transverse direction outer side), and the head portion H of the vehicle occupant P is protected at the time of a side collision. Here, the predetermined angle of the seatback 14 with respect to the vertical direction is an angle at which the head portion H of the vehicle occupant P cannot be restrained by the curtain airbag 110 at the time of a side collision, or, in other words, is the angle at which the head portion H comes out of the protection area of the curtain airbag 110. In the first embodiment, the predetermined angle of the seatback 14 with respect to the vertical direction is 45° as an example.

<Example of Flow of Control of Seat Controlling Device>

Figure 5:
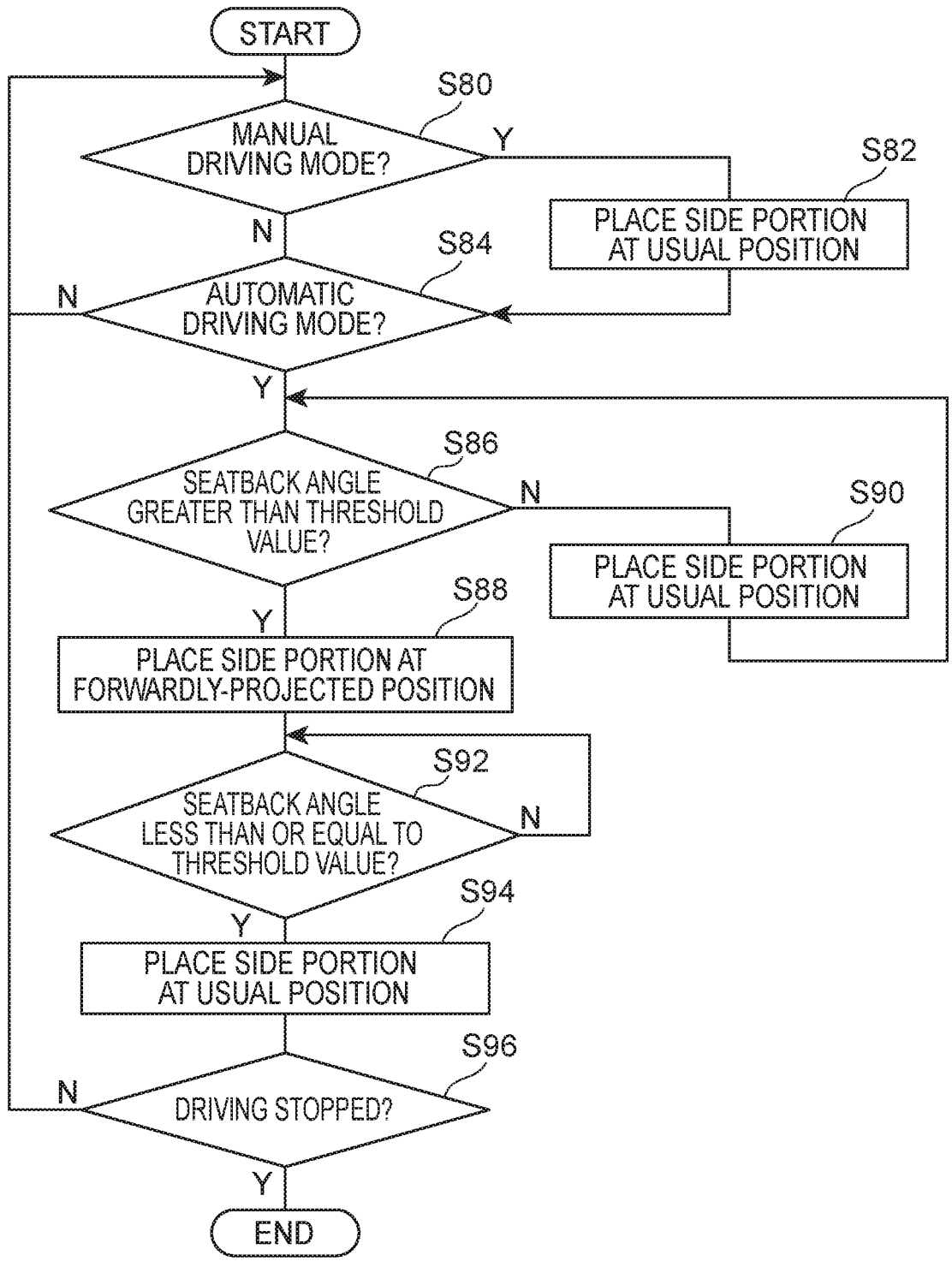
FIG. 5 is a flowchart showing an example of the flow of the control of the controlling device of a driver's seat at the vehicle seat relating to the first embodiment.

An example of the flow of specific processings that are carried out by the seat controlling device 60 at the seat control section 62 thereof is described next. FIG. 5 is a flowchart showing an example of the flow of control that changes the positions of the side portions 16B, 16C of the headrest 16, which control is carried out by the seat controlling device 60 at the seat control section 62 thereof.

As shown in FIG. 5, in step S80, the control section 62 judges whether or not the driving mode of the vehicle is the manual driving mode. If this judgment is affirmative, the routine moves on to step S82.

In step S82, the control section 62 places the side portions 16B, 16C of the headrest 16 at the usual positions D1. For example, if the side portions 16B, 16C of the headrest 16 are originally at the usual positions D1, the control section 62 has the side portions 16B, 16C of the headrest 16 standby as is at the usual positions D1. Further, if the side portions 16B, 16C of the headrest 16 are at the projected positions D2, the control section 62 moves the side portions 16B, 16C of the headrest 16 to the usual positions D1.

When the above-described judgment is negative in step S80, the routine moves on to step S84. Further, when step S82 has been executed, the routine moves on to step S84.

In step S84, the control section 62 judges whether or not the driving mode of the vehicle is the automatic driving mode. If this judgment is affirmative, the routine moves on to step S86. If this judgment is negative, the routine returns to step S80.

In step S86, the control section 62 judges whether or not the angle α of the seatback 14 with respect to the vertical direction is greater than a threshold value. In the first embodiment, the threshold value is 45°. If this judgment is affirmative, the routine moves onto step S88.

In step S88, the control section 62 places the side portions 16B, 16C of the headrest 16 at the projected positions D2 of projecting-out toward the vehicle front side. For example, if the side portions 16B, 16C of the headrest 16 are at the usual positions D1, the control section 62 moves the side portions 16B, 16C of the headrest 16 to the projected positions D2 of projecting-out toward the vehicle front side.

In step S86, if the above-described judgment is negative, the routine moves on to step S90. In step S90, the control section 62 places the side portions 16B, 16C of the headrest 16 at the usual positions D1. For example, if the side portions 16B, 16C of the headrest 16 are originally at the usual positions D1, the control section 62 has the side portions 16B, 16C of the headrest 16 standby as is at the usual positions D1. When step S90 has been executed, the routine returns to step S86.

In step S92, the control section 62 judges whether or not the angle α of the seatback 14 with respect to the vertical direction is less than or equal to the threshold value. The routine stands-by until this judgment is affirmative, and then moves on to step S94.

In step S94, the control section 62 places the side portions 16B, 16C of the headrest 16 at the usual positions D1. The control section 62 moves the side portions 16B, 16C of the headrest 16 from the projected positions D2 to the usual positions D1.

In step S96, the control section 62 judges whether or not driving is stopped. If this judgment is affirmative, the control device 62 stops the series of processings of the seat controlling device 60. Further, if this judgment is negative, the routine returns to step S80.

<Operation and Effects>

Operation and effects of the first embodiment are described next.

At the seat 10, when the seatback 14 is tilted rearward beyond a predetermined angle (e.g., 45°) with respect to the vertical direction, the side portions 16B, 16C of the headrest 16 cover the sides of the head portion H of the vehicle occupant P. In the first embodiment, due to the side portions 16B, 16C of the headrest 16 moving from the usual positions D1 to the projected positions D2 of projecting-out toward the vehicle front side, the side portions 16B, 16C of the headrest 16 cover the sides of the head portion H of the vehicle occupant P. Due thereto, in the case of a comfortable attitude in which the seatback 14 has been greatly tilted rearward, the head portion H of the vehicle occupant P can be protected from a side collision by the side portions 16B, 16C of the headrest 16 (in the first embodiment, in particular, the side portion 16B that is at the vehicle transverse direction outer side).

Further, the vehicle 100 that is equipped with the seat 10 can switch between the automatic driving mode and the manual driving mode. In the first embodiment, in the automatic driving mode, in the case of a comfortable attitude in which the seatback 14 has been greatly tilted rearward (e.g., a case in which the seatback 14 has been tilted rearward beyond a predetermined angle with respect to the vertical direction), the side portions 16B, 16C of the headrest 16 project-out toward the vehicle front side. Due thereto, the sides of the head portion H of the vehicle occupant P are covered by the side portions 16B, 16C of the headrest 16, and therefore, the head portion H of the vehicle occupant P can be effectively protected from a side collision. Further, in the automatic driving mode, the side visual fields of the vehicle occupant P are not as important as in the manual driving mode, and therefore, it is difficult for the projected-out side portions 16B, 16C of the headrest 16 to obstruct the side visual fields of the vehicle occupant P.

Further, at the seat 10, when the seatback 14 is tilted rearward in the manual driving mode, the side portions 16B, 16C of the headrest 16 do not project-out toward the vehicle front side. Therefore, in the manual driving mode, the side portions 16B, 16C of the headrest 16 do not hinder the driving of the vehicle occupant P.

Further, at the seat 10, the headrest 16 is provided as a body separate from the seatback 14, and the side portions 16B, 16C of the headrest 16 are moved in the vehicle longitudinal direction. Therefore, when the seatback 14 is tilted rearward, the side portions 16B, 16C of the headrest 16 can be moved by a simple structure.

Figure 13:
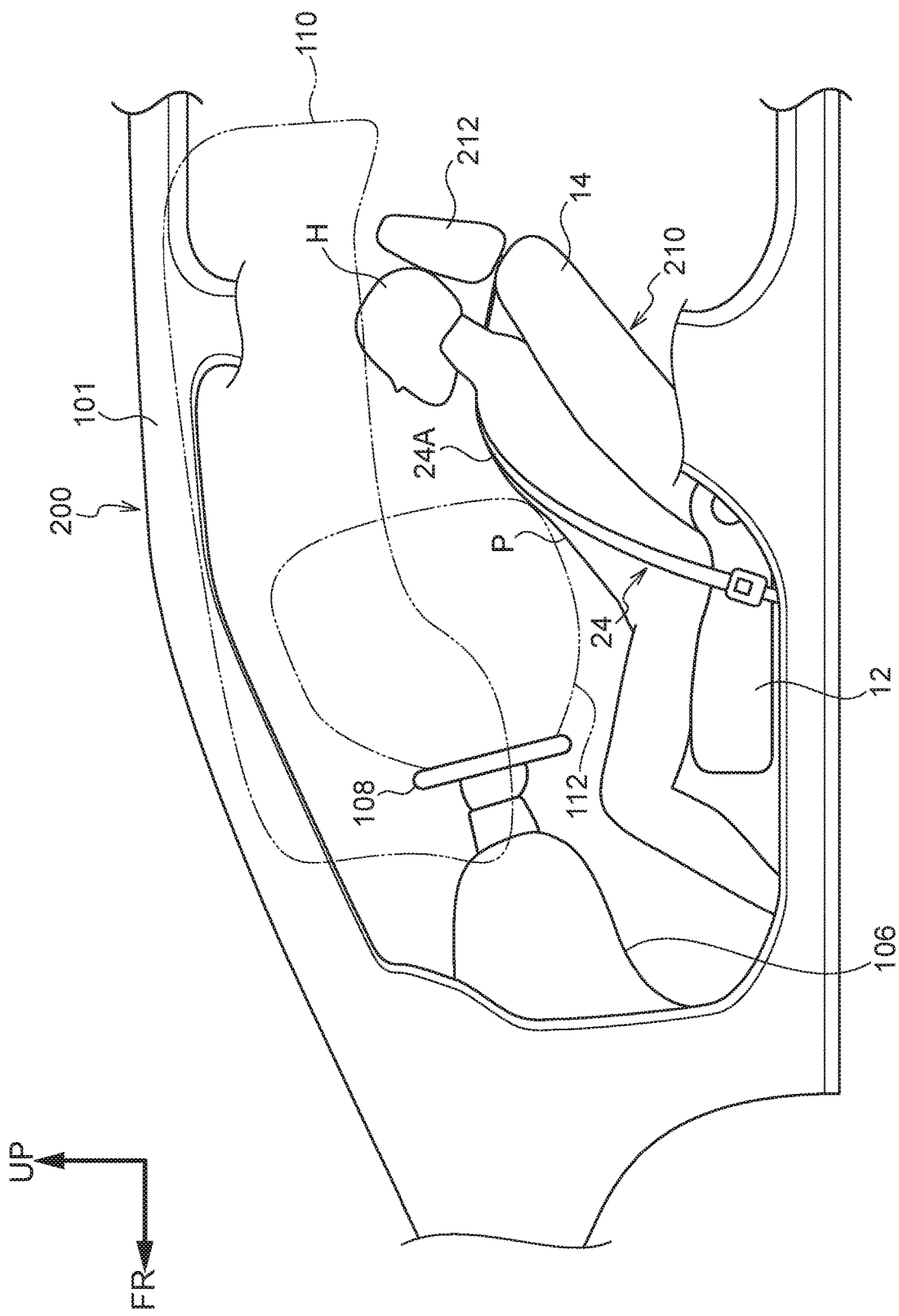
FIG. 13 is a schematic side view showing a state in which the seatback has been tilted rearward beyond a predetermined angle with respect to the vertical direction, in a vehicle that is equipped with a vehicle seat relating to a comparative example.

A vehicle 200, which is equipped with a seat 210 that serves as a vehicle seat of a comparative example, is illustrated in FIG. 13. As shown in FIG. 13, at the seat 210, a headrest 212 is mounted to the upper end portion of the seatback 14. A portion that moves even if the seatback 14 is tilted rearward is not provided at the headrest 212. Further, at the vehicle 200, the curtain airbag 110 is provided at the vehicle transverse direction inner side of the roof side rail 101 at the reverse surface side of the vehicle transverse direction outer side end portion of a roof head lining (not illustrated).

At the seat 210, when the seatback 14 is tilted rearward greatly, there is the possibility that the head portion H of the vehicle occupant P who is seated in the seat 210 will come out of the protection area of the curtain airbag 110.

In contrast, in the seat 10 of the first embodiment, in the automatic driving mode, when the seatback 14 is tilted rearward beyond a predetermined angle (e.g., 45°) with respect to the vertical direction, the side portions 16B, 16C of the headrest 16 project-out toward the vehicle front side, and the sides of the head portion H of the vehicle occupant P seated in the seat 10 are covered by the side portions 16B, 16C of the headrest 16. Therefore, as shown in FIG. 6, even in a case in which the head portion H of the vehicle occupant P comes out of the protection area of the curtain airbag 110 when the seatback 14 is greatly tilted rearward, the head portion H of the vehicle occupant P can be protected from a side collision by the side portions 16B, 16C.

Second Embodiment

A vehicle seat of a second embodiment is described next by using FIG. 7. Note that structural portions that are the same as those of the above-described first embodiment are denoted by the same reference numerals, and description thereof is omitted.

Figure 7:
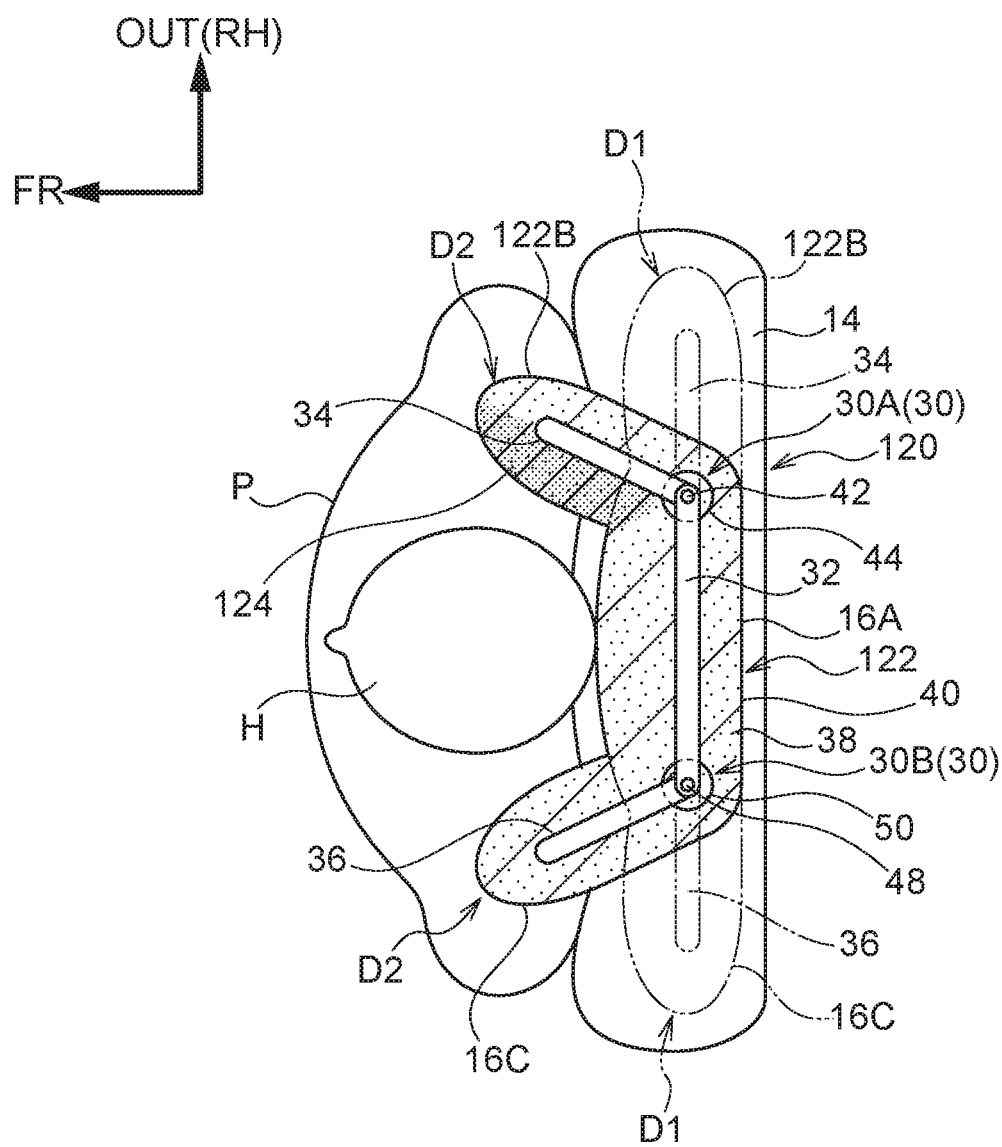
FIG. 7 is a plan sectional view that corresponds to FIG. 2 and shows a headrest that is used in a vehicle seat relating to a second embodiment.

As shown in FIG. 7, at a vehicle seat (hereinafter called "seat") 120, a headrest 122 serving as a head portion restraining portion is mounted to the upper end portion of the seatback 14. The headrest 122 has the main body portion 16A that is disposed at the vehicle transverse direction intermediate portion, a side portion 122B that is disposed at the vehicle transverse direction outer side (in the second embodiment, the vehicle transverse direction right side as seen in a vehicle rear view) of the main body portion 16A, and the side portion 16C that is disposed at the vehicle transverse direction inner side (in the second embodiment, the vehicle transverse direction left side as seen in a vehicle rear view) of the main body portion 16A.

A hard pad 124 is disposed at the interior of the side portion 122B that is at the vehicle transverse direction outer side, at the side of the head portion H of the vehicle occupant P. The hard pad 124 is formed of a resin that has higher hardness than the pad 38 that is disposed at the other portions of the headrest 122 (for example, the hard pad 124 is formed of a foamed resin or the like that is harder than the foamed resin that structures the pad 38). The hard pad 124 is disposed within the side portion 122B, further toward the side of the head portion H of the vehicle occupant P than the frame 34. In other words, the hard pad 124 is disposed further toward the vehicle longitudinal direction front side than the frame 34, in the state in which the side portion 122B is at the usual position D1.

At the above-described seat 120, when the seatback 14 is tilted rearward beyond a predetermined angle (e.g., 45°) with respect to the vertical direction, the side portions 122B, 16C that are at the vehicle transverse direction both sides of the headrest 122 move toward the projected positions D2 of being projected-out toward the vehicle front side. Therefore, a side of the head portion H of the vehicle occupant P is covered by the side portion 122B that is at the vehicle transverse direction outer side of the headrest 122 and in which the hard pad 124 is incorporated. Due thereto, the head portion H of the vehicle occupant P can be protected effectively from a side collision.

Third Embodiment

Figure 8:
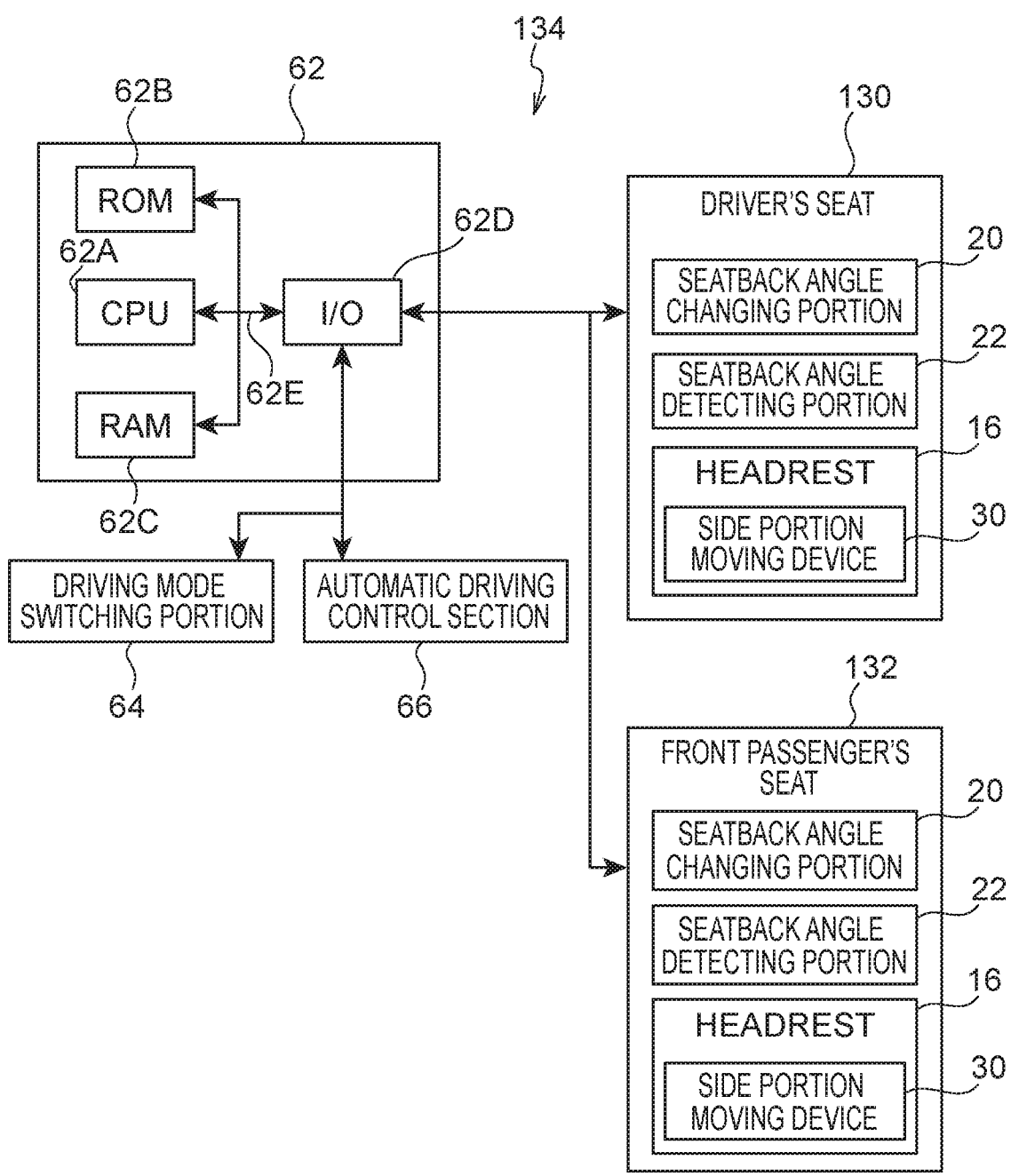
FIG. 8 is a block drawing showing the structure of a controlling device of a vehicle seat relating to a third embodiment.
Figure 10:
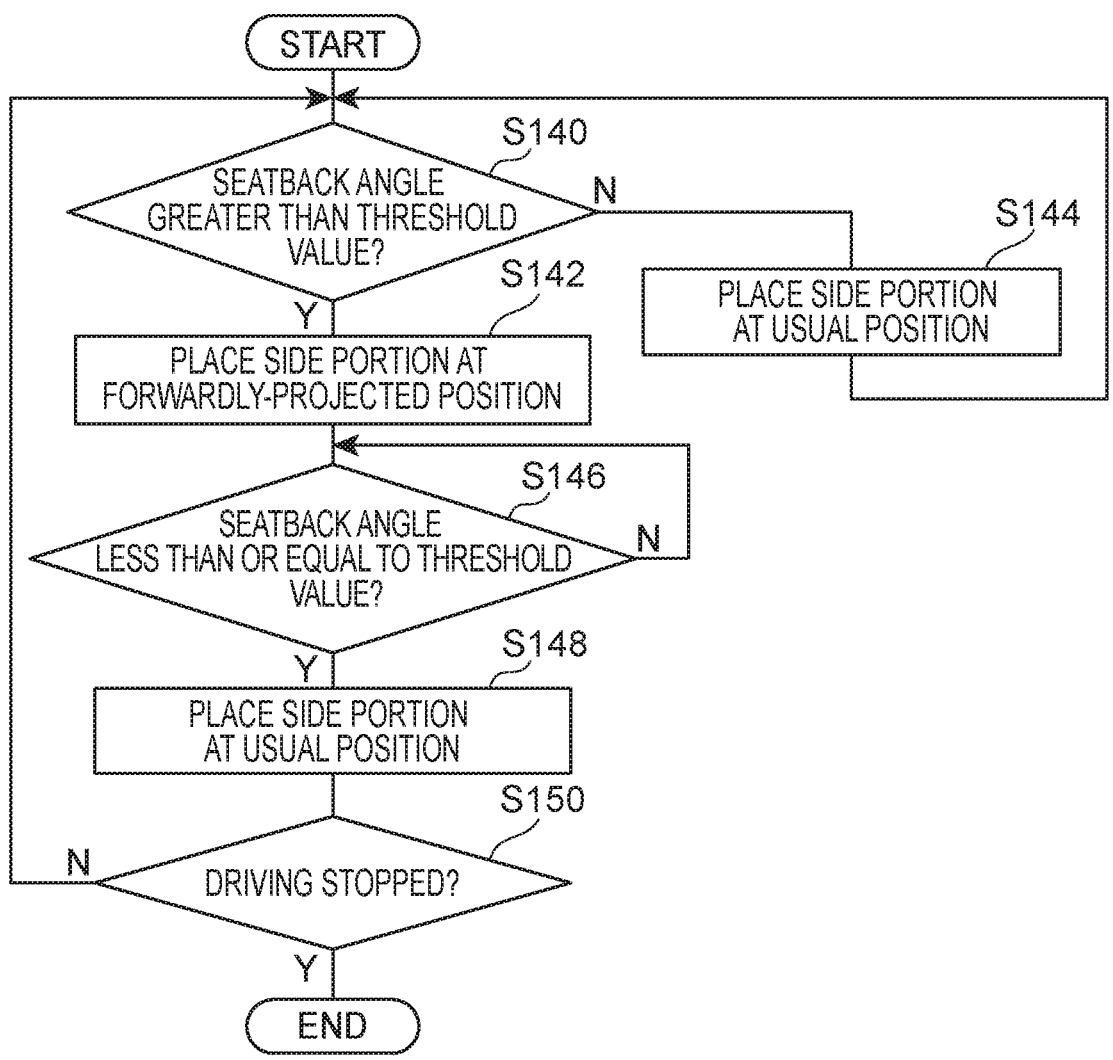
FIG. 10 is a flowchart showing an example of the flow of the control of the controlling device of the front passenger's seat in the vehicle seat relating to the third embodiment.

A vehicle seat of a third embodiment is described by using FIG. 8 through FIG. 10. Note that structural portions that are the same as those of the above-described first and second embodiments are denoted by the same reference numerals, and description thereof is omitted.

As shown in FIG. 8, the third embodiment has a driver's seat 130 that serves as a vehicle seat and is provided at the vehicle front right side (in the third embodiment, the driver's seat side), and a front passenger's seat 132 that serves as a vehicle seat and is provided at the vehicle front left side (in the third embodiment, the front passenger's seat side). A seat controlling device 134 controls the driver's seat 130 and the front passenger's seat 132 respectively by the control section 62. The structures of the respective members of the driver's seat 130 and the front passenger's seat 132 are the same as those of the seat 10 of the first embodiment (see FIG. 2).

The relationship between the angle α of the seatback 14 with respect to the vertical direction, and the positions of the side portions 16B, 16C (see FIG. 2) of the headrest 16, in the manual driving mode and the automatic driving mode at the driver's seat 130 and the front passenger's seat 132 is shown in FIG. 9. As shown in FIG. 9, at the driver's seat 130, in the manual driving mode and the automatic driving mode, the positions of the side portions 16B, 16C of the headrest 16 with respect to the angle α of the seatback 14 with respect to the vertical direction are the same as in the case of the seat 10 of the first embodiment (see FIG. 4).

At the front passenger's seat 132, control that is different than the control of the driver's seat 130 is carried out. At the front passenger's seat 132, control is the same in the manual driving mode and in the automatic driving mode. At the front passenger's seat 132, the angle α of the seatback 14 with respect to the vertical direction being less than or equal to a predetermined angle (e.g., 45°) is a usual state. In the usual state, in both the case of the manual driving mode and the case of the automatic driving mode, the side portions 16B, 16C of the headrest 16 are disposed at the usual positions D1 (see FIG. 2). Further, the angle α of the seatback 14 with respect to the vertical direction being greater than a predetermined angle (e.g., 45°) is a comfortable state. In the comfortable state, in both the case of the manual driving mode and the case of the automatic driving mode, the side portions 16B, 16C of the headrest 16 are disposed at the projected positions D2 (see FIG. 2).

FIG. 10 is a flowchart showing an example of the flow of control that changes the positions of the side portions 16B, 16C (see FIG. 2) of the headrest 16 of the front passenger's seat 132, which control is carried out by the seat controlling device 134 at the control section 62 thereof.

As shown in FIG. 10, in step S140, the control section 62 judges whether or not the angle α of the seatback 14 with respect to the vertical direction is greater than a threshold value. In the third embodiment, the threshold value is 45°. If this judgment is affirmative, the routine moves on to step S142.

In step S142, the control section 62 places the side portions 16B, 16C of the headrest 16 of the front passenger's seat 132 at the projected positions D2 of projecting-out toward the vehicle front side. For example, when the side portions 16B, 16C of the headrest 16 of the front passenger's seat 132 are at the usual positions D1, the control section 62 moves the side portions 16B, 16C of the headrest 16 to the projected positions D2 of projecting-out toward the vehicle front side.

In step S140, if the aforementioned judgment is negative, the routine moves on to step S144. In step S144, the control section 62 places the side portions 16B, 16C of the headrest 16 of the front passenger's seat 132 at the usual positions D1. For example, if the side portions 16B, 16C of the headrest 16 are originally at the usual positions D1, the control section 62 has the side portions 16B, 16C of the headrest 16 standby at the usual positions D1 as is. When step S144 is executed, the routine returns to step S140.

In step S146, the control section 62 judges whether or not the angle α with respect to the vertical direction of the seatback 14 of the front passenger's seat 132 is less than or equal to a threshold value. The routine stands-by until this judgment is affirmative, and then moves on to step S148.

In step S148, the control section 62 places the side portions 16B, 16C of the headrest 16 of the front passenger's seat 132 at the usual positions D1. The control section 62 moves the side portions 16B, 16C of the headrest 16 from the projected positions D2 to the usual positions D1.

In step S150, the control section 62 judges whether or not driving is stopped. If this judgment is affirmative, the control section 62 stops the series of processings of the control of the front passenger's seat 132 by the seat controlling device 134. If this judgment is negative, the routine returns to step S140.

The above-described driver's seat 130 and front passenger's seat 132 have the following effects, in addition to the effects described in the first embodiment.

In the third embodiment, when the seatback 14 is tilted rearward in the manual driving mode, at the driver's seat 130, the side portions 16B, 16C of the headrest 16 are not projected-out toward the vehicle front side, and, at the front passenger's seat 132, the side portions 16B, 16C of the headrest 16 are projected-out toward the vehicle front side. Namely, when the seatback 14 is tilted rearward in the manual driving mode, at the front passenger's seat 132, the side portions 16B, 16C are projected toward the vehicle front side, and therefore, the head portion H of the vehicle occupant P seated in the front passenger's seat 132 can be effectively protected from a side collision. Further, due to the vehicle occupant P, who is seated in the front passenger's seat 132 and who is not involved in the driving, tilting the seatback 14 rearward, the vehicle occupant P can assume a relaxed position. Moreover, when the seatback 14 is tilted rearward in the manual driving mode, at the driver's seat 130, the side portions 16B, 16C of the headrest 16 are not projected-out toward the vehicle front side, and therefore, the side portions 16B, 16C of the headrest 16 are not a hindrance to driving.

Fourth Embodiment

A vehicle seat of a fourth embodiment is described next by using FIG. 11. Note that structural portions that are the same as those of the above-described first through third embodiments are denoted by the same reference numerals, and detailed description thereof is omitted.

Figure 11:
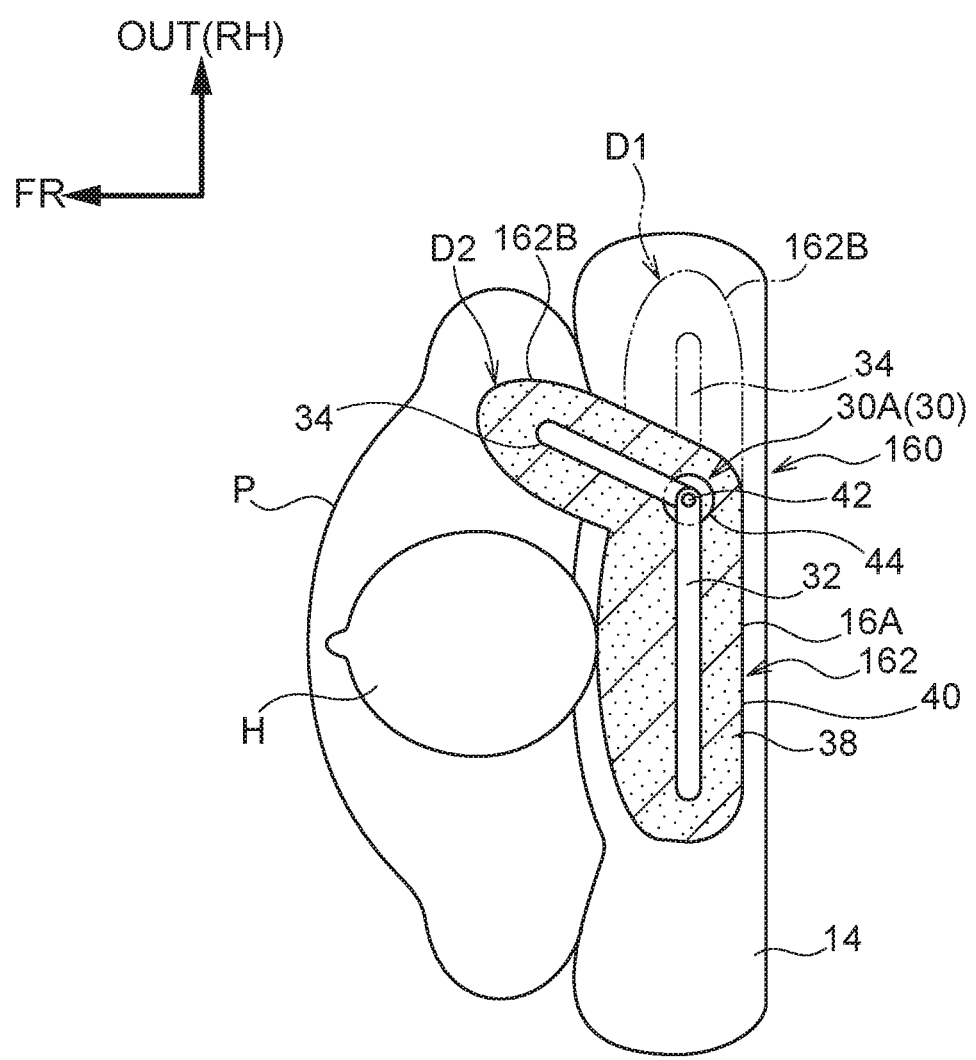
FIG. 11 is a plan sectional view that corresponds to FIG. 2 and shows a headrest that is used in a vehicle seat relating to a fourth embodiment.

As shown in FIG. 11, at a vehicle seat (hereinafter called "seat") 160, a headrest 162 that serves as a head portion restraining portion is mounted to the upper end portion of the seatback 14. The headrest 162 has the main body portion 16A that is disposed at the vehicle transverse direction intermediate portion, and a side portion 162B that is disposed at the vehicle transverse direction outer side (in the fourth embodiment, the vehicle transverse direction right side as seen in a vehicle rear view) of the main body portion 16A. The side portion 162B can move from the usual position D1 to the projected position D2 of being projected-out toward the vehicle front side. Note that, in the fourth embodiment, a side portion that can project-out toward the vehicle front side is not provided at the vehicle transverse direction inner side (in the fourth embodiment, the vehicle transverse direction left side as seen in a vehicle rear view) of the main body portion 16A of the headrest 162. Further, in the fourth embodiment, the vehicle transverse direction length of the headrest 162 in which the side portions are at the usual positions D1 is shorter than the vehicle transverse direction length of the headrest 16 (see FIG. 2) at the usual position D1 in the first embodiment.

At the seat 160, when the seatback 14 is tilted rearward beyond a predetermined angle (e.g., 45°) with respect to the vertical direction, the side portion 162B that is at the vehicle transverse direction outer side of the headrest 162 projects-out toward the vehicle front side, and covers the side of the head portion H of the vehicle occupant P. Due thereto, in a case in which the seatback 14 is tilted rearward greatly, the head portion H of the vehicle occupant P can be protected from a side collision by the side portion 162B that is at the vehicle transverse direction outer side of the headrest 162.

Note that, in the fourth embodiment, instead of the above-described structure, the vehicle transverse direction length of the headrest 162 at the usual position D1 may be made to be longer by extending the main body portion 16A toward the vehicle transverse direction inner side (in the fourth embodiment, the vehicle transverse direction left side as seen in a vehicle rear view).

Fifth Embodiment

A vehicle seat of a fifth embodiment is described next by using FIG. 12. Note that structural portions that are the same as those of the above-described first through fourth embodiments are denoted by the same reference numerals, and description thereof is omitted.

Figure 12:
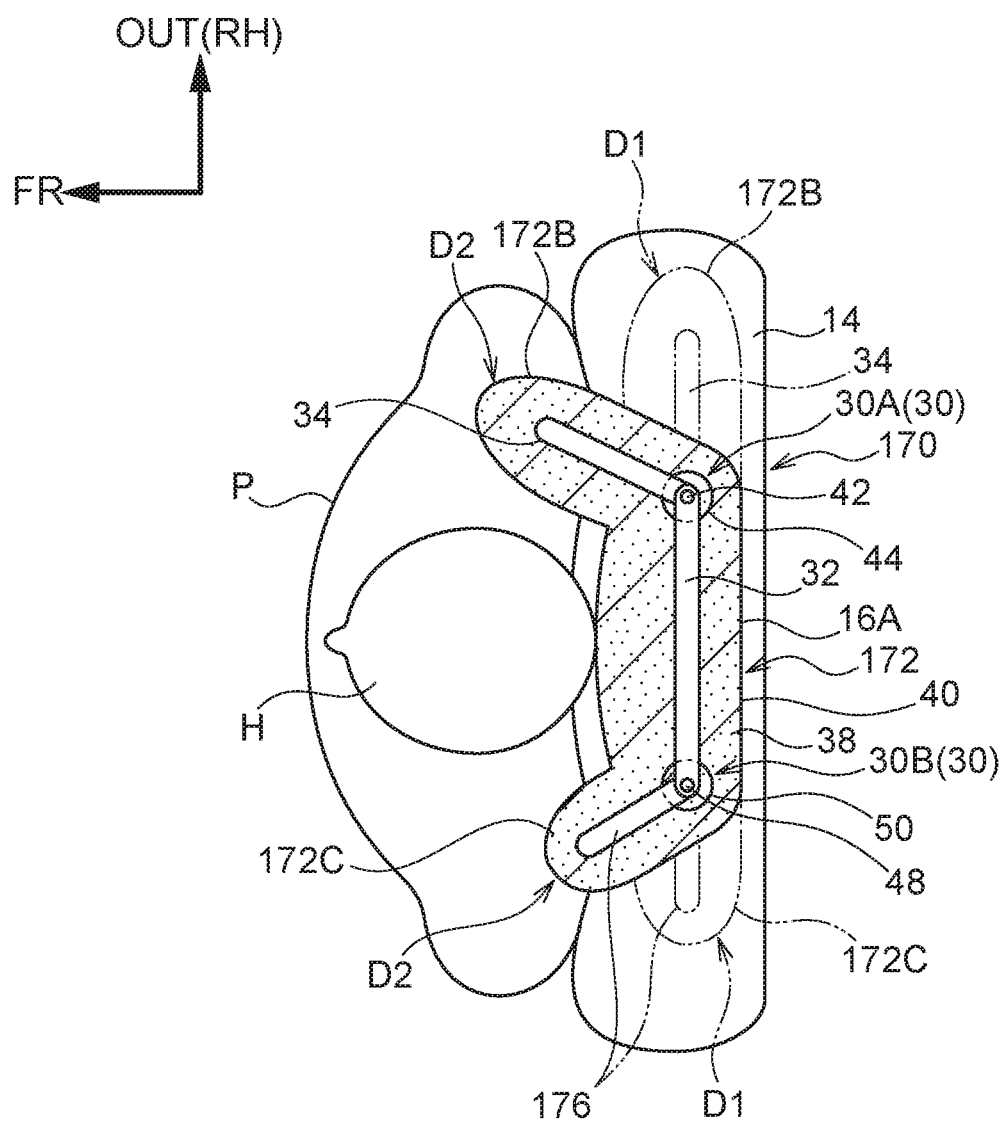
FIG. 12 is a plan sectional view that corresponds to FIG. 2 and shows a headrest that is used in a vehicle seat relating to a fifth embodiment.

As shown in FIG. 12, at a vehicle seat (hereinafter called "seat") 170, a headrest 172 that serves as a head portion restraining portion is mounted to the upper end portion of the seatback 14. The headrest 172 has the main body portion 16A that is disposed at the vehicle transverse direction intermediate portion, a side portion 172B that is disposed at the vehicle transverse direction outer side (in the fifth embodiment, the vehicle transverse direction right side as seen in a vehicle rear view) of the main body portion 16A, and a side portion 172C that is disposed at the vehicle transverse direction inner side (in the fifth embodiment, the vehicle transverse direction left side as seen in a vehicle rear view) of the main body portion 16A. The length of the side portion 172B in the vehicle transverse direction is longer than the length of the side portion 172C in the vehicle transverse direction. A frame 176, whose length direction length is shorter than the length direction length of the frame 34, is provided at the interior of the side portion 172C.

At the seat 170, when the seatback 14 is tilted rearward beyond a predetermined angle (e.g., 45°) with respect to the vertical direction, the side portions 172B, 172C that are at the vehicle transverse direction both sides of the headrest 172 move from the usual positions D1 to the projected positions D2 of projecting-out toward the vehicle front side, and cover the sides of the head portion H of the vehicle occupant P. At this time, the amount of projection, toward the vehicle front side, of the side portion 172B that is at the vehicle transverse direction outer side of the headrest 172 is greater than the amount of projection, toward the vehicle front side, of the side portion 172C that is at the vehicle transverse direction inner side of the headrest 172. Due thereto, at the seat 170, the head portion H of the vehicle occupant P can be effectively protected from a side collision by the side portion 172B that is at the vehicle transverse direction outer side of the headrest 172.

[Supplementary Description]

Note that, in the first through the fifth embodiment, the structures of the side portion moving device 30 that causes the side portions of the headrests 16, 122, 162, 172 to project-out toward the vehicle front side can be changed. Further, in the first through the fifth embodiments, although the side portions of the headrests 16, 122, 162, 172 are structures that rotate toward the vehicle front side, the present disclosure is not limited to this. For example, there may be a structure in which the side portions of the headrests are projected-out toward the vehicle front side by being slid toward the vehicle front side substantially along the vehicle longitudinal direction. For example, the side portion moving device may be a structure that rotates the side portions of the headrest in directions of projecting-out toward the vehicle front side, by using driving portions such as actuators, hydraulic cylinders or the like, or by link mechanisms or the like. Further, for example, the side portion moving device may be a structure that slides the side portions of the headrest in directions of projecting-out toward the vehicle front side, by using driving portions such as actuators, hydraulic cylinders or the like, or by link mechanisms or rack-and-pinions or the like. Further, at the front passenger's seat at which operation is not changed in the manual driving mode and the automatic driving mode, a push-pull wire that connects the side portion of the headrest and the seat cushion may be used, and the side portion may be projected-out toward the vehicle front side by pulling the side portion by the push-pull wire accompanying the rearward tilting of the seatback.

Further, in the first through fifth embodiments, the airbag for protecting the head portion may be, for example, a side airbag that is provided within the side door and that inflates and expands toward the vehicle upper side.

Further, in the first through fifth embodiments, the driving mode can be switched between the manual driving mode and the automatic driving mode, but the present disclosure is not limited to this structure. For example, the present disclosure can also be applied to a vehicle seat that is used in a vehicle in which only manual driving (i.e., usual traveling) is carried out, without switching between a manual driving mode and an automatic driving mode.

Further, in the third embodiment, the side portions 16B, 16C of the headrest 16 are made to project-out toward the vehicle front side when the seatback 14 of the front passenger's seat 132 is tilted rearward beyond a predetermined angle (e.g., 45°) with respect to the vertical direction, in both the manual driving mode and the automatic driving mode. However, the present disclosure is not limited to this structure. For example, at least the side portion that is at the vehicle transverse direction outer side of the headrest may be made to project-out toward the vehicle front side when the seatback is tilted rearward beyond a predetermined angle (e.g., 45°) with respect to the vertical direction, in both the manual driving mode and the automatic driving mode, at all of the vehicle seats other than the driver's seat.

Further, the third through the fifth embodiments may be structured such that a hard pad is incorporated in the side portion that is at the vehicle transverse direction outer side of the headrest of the driver's seat, or may be structured such that hard pads are incorporated in the side portions that are at the vehicle transverse direction outer sides of the headrests of vehicle seats other than the driver's seat, such as the front passenger's seat and the like.

Further, the structures of the headrests 162, 172 that are described in the fourth and the fifth embodiment may be applied to vehicle seats other than the driver's seat, such as the front passenger's seat and the like.

Further, in the first through the fifth embodiment, the headrests 16, 122, 162, 172 are provided as a body separate from the seatback 14, but the present disclosure is not limited to this structure. For example, in a vehicle seat in which a seatback and a head portion restraining portion that restrains the head portion of a vehicle occupant (i.e., a headrest portion) are provided integrally, there may be a structure in which the side portion of the head portion restraining portion is moved in a direction of projecting-out toward the vehicle front side.

Note that, although the present disclosure has been described in detail by using specific embodiments, the present disclosure is not limited to these embodiments, and it will be clear to those skilled in the art that other various embodiments are possible within the scope of the present disclosure.

Note that the disclosure of Japanese Patent Application No. 2018-008973 that was filed on Jan. 23, 2018 is, in its entirety, incorporated by reference into the present specification.

All publications, patent applications, and technical standards mentioned in the present specification are incorporated by reference into the present specification to the same extent as if such individual publication, patent application, or technical standard was specifically and individually indicated to be incorporated by reference.

What is claimed is:

1. A vehicle seat that is provided in a vehicle equipped with a head portion protecting airbag that protects a head portion of a vehicle occupant at a time of a side collision, the vehicle seat comprising:
   a head portion restraining portion that is at an upper portion side of a seatback so as to be able to tilt rearward from an upright state, and that restrains a head portion of a vehicle occupant, wherein,
   when the seatback is tilted rearward beyond a predetermined angle with respect to a vertical direction, the head portion of the vehicle occupant can be protected due to at least a side portion of the head portion restraining portion that is at a vehicle transverse direction outer side covering a side of the head portion of the vehicle occupant,
   the head portion restraining portion is a headrest that is a body separate from the seatback,
   the headrest comprises a main body portion inward of the side portion in a vehicle width direction, and
   when the seatback is tilted rearward beyond a predetermined angle with respect to a vertical direction, the side portion moves to a projected position that protrudes toward a vehicle front side from a usual position on an extended line extending outward from the main body portion in the vehicle width direction.

2. The vehicle seat of claim 1, wherein:
   the side portion that is at the vehicle transverse direction outer side of the head portion restraining portion incorporates a hard pad therein.

3. The vehicle seat of claim 1, wherein:
   the vehicle can switch between an automatic driving mode and a manual driving mode, and
   when the seatback is tilted rearward in the automatic driving mode, a side portion of the head portion restraining portion projects out toward a seat front side.

4. The vehicle seat of claim 3, wherein, when the seatback is tilted rearward in the manual driving mode, the side portion of the head portion restraining portion does not project out toward the seat front side.

5. The vehicle seat of claim 3, wherein, when the seatback is tilted rearward in the manual driving mode, at a driver's seat, the side portion of the head portion restraining portion is not projected out toward the seat front side, and, at a front passenger's seat, the side portion of the head portion restraining portion is projected out toward the seat front side.

6. The vehicle seat of claim 1, wherein an amount of projection, toward a seat front side, of the side portion that is at the vehicle transverse direction outer side of the head portion restraining portion is greater than an amount of projection, toward the seat front side, of a side portion that is at a vehicle transverse direction inner side of the head portion restraining portion.

7. A vehicle comprising:
   the vehicle seat of claim 1; and
   a head portion protecting airbag that is at a reverse surface side of a vehicle transverse direction outer side end portion of a roof head lining, and that, at a time of a side collision, inflates and expands toward a vehicle vertical direction lower side and protects a head portion of a vehicle occupant.

8. The vehicle of claim 7, wherein the vehicle can switch between an automatic driving mode and a manual driving mode.

9. A vehicle seat that is provided in a vehicle equipped with a head portion protecting airbag that protects a head portion of a vehicle occupant at a time of a side collision, the vehicle seat comprising:
   a head portion restraining portion that is at an upper portion side of a seatback so as to be able to tilt rearward from an upright state, and that restrains a head portion of a vehicle occupant,
   wherein, when the seatback is tilted rearward beyond a predetermined angle with respect to a vertical direction, the head portion of the vehicle occupant can be protected due to at least a side portion that is at a vehicle transverse direction outer side of the head portion restraining portion covering a side of the head portion of the vehicle occupant,
   the vehicle can switch between an automatic driving mode and a manual driving mode,
   when the seatback is tilted rearward in the automatic driving mode, a side portion of the head portion restraining portion projects out toward a seat front side, and
   when the seatback is tilted rearward in the manual driving mode, the side portion of the head portion restraining portion does not project out toward the seat front side.

10. The vehicle seat of claim 9, wherein:
    the side portion that is at the vehicle transverse direction outer side of the head portion restraining portion incorporates a hard pad therein, and
    when the seatback is tilted rearward, at least the side portion that is at the vehicle transverse direction outer side of the head portion restraining portion projects out toward a seat front side.

11. The vehicle seat of claim 9, wherein an amount of projection, toward a seat front side, of the side portion that is at the vehicle transverse direction outer side of the head portion restraining portion is greater than an amount of projection, toward the seat front side, of a side portion that is at a vehicle transverse direction inner side of the head portion restraining portion.

12. The vehicle seat of claim 9, wherein the head portion restraining portion is a headrest that is a body separate from the seatback.

13. A vehicle comprising:
    the vehicle seat of claim 9; and
    a head portion protecting airbag that is at a reverse surface side of a vehicle transverse direction outer side end portion of a roof head lining, and that, at a time of a side collision, inflates and expands toward a vehicle vertical direction lower side and protects a head portion of a vehicle occupant.

14. The vehicle of claim 13, wherein the vehicle can switch between an automatic driving mode and a manual driving mode.

15. A vehicle seat that is provided in a vehicle equipped with a head portion protecting airbag that protects a head portion of a vehicle occupant at a time of a side collision, the vehicle seat comprising:
    a head portion restraining portion that is at an upper portion side of a seatback so as to be able to tilt rearward from an upright state, and that restrains a head portion of a vehicle occupant,
    wherein, when the seatback is tilted rearward beyond a predetermined angle with respect to a vertical direction, the head portion of the vehicle occupant can be protected due to at least a side portion that is at a vehicle transverse direction outer side of the head portion restraining portion covering a side of the head portion of the vehicle occupant, the vehicle can switch between an automatic driving mode and a manual driving mode, when the seatback is tilted rearward in the automatic driving mode, a side portion of the head portion restraining portion projects out toward a seat front side, and when the seatback is tilted rearward in the manual driving mode, at a driver's seat, the side portion of the head portion restraining portion is not projected out toward the seat front side, and, at a front passenger's seat, the side portion of the head portion restraining portion is projected out toward the seat front side.

16. The vehicle seat of claim 15, wherein:

the side portion that is at the vehicle transverse direction outer side of the head portion restraining portion incorporates a hard pad therein, and when the seatback is tilted rearward, at least the side portion that is at the vehicle transverse direction outer side of the head portion restraining portion projects out toward a seat front side.

17. The vehicle seat of claim 15, wherein an amount of projection, toward a seat front side, of the side portion that is at the vehicle transverse direction outer side of the head portion restraining portion is greater than an amount of projection, toward the seat front side, of a side portion that is at a vehicle transverse direction inner side of the head portion restraining portion.

18. The vehicle seat of claim 15, wherein the head portion restraining portion is a headrest that is a body separate from the seatback.

19. A vehicle comprising:

the vehicle seat of claim 15; and a head portion protecting airbag that is at a reverse surface side of a vehicle transverse direction outer side end portion of a roof head lining, and that, at a time of a side collision, inflates and expands toward a vehicle vertical direction lower side and protects a head portion of a vehicle occupant.

20. The vehicle of claim 19, wherein the vehicle can switch between an automatic driving mode and a manual driving mode.

* * * * *